(12) United States Patent
Schroeder

(10) Patent No.: US 9,185,844 B2
(45) Date of Patent: Nov. 17, 2015

(54) FEEDING MECHANISM OF A HEADER FOR A COMBINE HARVESTER

(71) Applicant: CNH America LLC, New Holland, PA (US)

(72) Inventor: Jay David Schroeder, Coal Valley, IL (US)

(73) Assignee: CNH Industrial America LLC, New Holland, PA (US)

(*) Notice: Subject to any disclaimer, the term of this patent is extended or adjusted under 35 U.S.C. 154(b) by 122 days.

(21) Appl. No.: 14/043,297

(22) Filed: Oct. 1, 2013

(65) Prior Publication Data

US 2015/0089915 A1    Apr. 2, 2015

(51) Int. Cl.
| A01D 43/00 | (2006.01) |
| A01D 61/00 | (2006.01) |
| A01D 41/14 | (2006.01) |
| A01D 45/02 | (2006.01) |

(52) U.S. Cl.
CPC .............. *A01D 61/002* (2013.01); *A01D 41/14* (2013.01); *A01D 45/021* (2013.01)

(58) Field of Classification Search
CPC ....... A01D 41/14; A01D 41/16; A01D 43/06; A01D 43/107; A01D 57/20; A01D 61/002; A01D 61/008; A01D 75/187; A01D 45/021; A01D 41/142
USPC ........ 56/14.4, 14.5, 153, 158, 16.6, 181, 208, 56/312; 460/106
See application file for complete search history.

(56) References Cited

U.S. PATENT DOCUMENTS

| 2,893,537 | A | * | 7/1959 | Krahn ........................... 198/513 |
| 3,333,405 | A |   | 8/1967 | Bulin |
| 3,411,274 | A |   | 11/1968 | Jarvis |
| 3,973,380 | A |   | 8/1976 | Knollman et al. |
| 4,345,417 | A |   | 8/1982 | deBuhr et al. |
| 4,724,661 | A | * | 2/1988 | Blakeslee et al. ............... 56/208 |
| 5,464,371 | A |   | 11/1995 | Honey |
| RE35,543 | E | * | 7/1997 | Patterson ........................ 56/14.4 |
| 5,657,621 | A |   | 8/1997 | Mendes et al. |
| 6,318,058 | B1 |   | 11/2001 | Emmert |
| 7,140,169 | B2 |   | 11/2006 | Ameye et al. |
| 7,650,736 | B1 | * | 1/2010 | Salley et al. ..................... 56/181 |
| 7,654,068 | B2 |   | 2/2010 | Baaken |
| 8,544,250 | B2 | * | 10/2013 | Lovett et al. .................... 56/153 |
| 2004/0255566 | A1 |   | 12/2004 | Phillips et al. |
| 2005/0120694 | A1 |   | 6/2005 | Calmer |
| 2007/0113533 | A1 |   | 5/2007 | Schafer et al. |
| 2007/0193243 | A1 | * | 8/2007 | Schmidt et al. ................. 56/181 |
| 2008/0161077 | A1 | * | 7/2008 | Honey ........................... 460/106 |

FOREIGN PATENT DOCUMENTS

| GB | 891442 | 3/1962 |
| GB | 1301844 A | 1/1973 |

* cited by examiner

*Primary Examiner* — Robert Pezzuto
(74) *Attorney, Agent, or Firm* — Patrick M. Sheldrake; Seyed V. Sharifi T.

(57) ABSTRACT

A header for a combine harvester capable of improving the flow of grain from the header to a feeder house and reducing grain buildup about a void proximate an aft section of the header is disclosed. The header includes a chassis and a cross auger extending in a widthwise direction of the chassis. The header also includes a feed mechanism mounted on the chassis proximate a posterior end of the cross auger and within the void of the header.

14 Claims, 11 Drawing Sheets

FEEDING MECHANISM OF A HEADER FOR A COMBINE HARVESTER

BACKGROUND

The subject application relates generally to a feeding mechanism of a header for a combine harvester. In particular, the subject application relates to a header having a conveyor, such as a cross auger, and a feeding mechanism for processing grain to a feeder house of the combine harvester.

Combines are used to harvest agricultural crops such as corn, soybeans, wheat and other grain crops. As the combine is driven through crop fields, the combine cuts the crop, separates the desired crop from the undesired waste, stores the crop, and discards the waste.

In a typical combine harvester, a header is mounted to the front of the combine to gather the crop and feed the crop into the combine for processing. As the combine is driven through the field, the crop material is collected by the header and transported to a feeder house. The crop material is then transported upwardly and into the combine by a feeder drum at the front of the feeder house and a feed elevator located within the feeder house. The crop material then typically passes through a threshing and separating mechanism. Stalk material that is separated from the grain is commonly referred to as material other than grain (MOG).

After passing through the threshing and separating mechanism, the grain and MOG are deposited onto a grain cleaning system. The grain cleaning system of a typical combine includes a pair of adjustable cleaning sieves, often referred to as a chaffer sieve and a shoe sieve.

The sieves are typically reciprocated back and forth in opposite directions along an arcuate path. This motion has the tendency to separate the grain from the MOG. To further separate the grain from the MOG, a cleaning fan or blower is positioned so as to blow air up through the cleaning sieves. This flow of air tends to blow the MOG, which is typically lighter than grain, rearwardly and out the back of the combine. Grain, which is heavier than MOG, is allowed to drop through the openings in the sieve.

The clean grain that falls through the cleaning sieves is deposited on a collection panel positioned beneath the cleaning sieves. The collection panel is angled so as to permit the grain to flow, under the influence of gravity, into an auger trough positioned along the lowermost edge of the collection panel. The auger trough is typically positioned near the forward end of the cleaning sieves and extends along the width of the sieves. The grain collected in the auger trough is then moved by an auger towards the side of the combine where it is raised by a grain elevator and deposited into a storage tank or grain tank.

In typical combines, current auger based headers have reached their effective capacity in regards to feeding material from the header cross auger into the combine's feeder house. Crop material cut by the header's knives is pulled into the cross auger for transport to the feeder house. The cross auger is typically adjusted to compress the moving crop material between the outer circumference of the cross auger flights and either the bottom of the auger trough or the rear wall of the header. However, as the cut crop material reaches the feeder house inlet opening, this pinch point is lost and the grain typically expands prior to being pulled into the feeder house. Oftentimes this expansion of crop material (especially in high volume crops) prevents the combine feeder conveyor from fully controlling the material resulting in crop material buildup about the feeder house inlet opening.

In conventional combine headers, a gap or void exists between the cross auger of the header and the feeder drum of the feeder house. This void creates a "dead zone" within which harvested grain is not actively being transported or moved. As a result, the rate of grain processed can be negatively impacted resulting in the buildup of grain at this location.

BRIEF SUMMARY

In accordance with an aspect of the subject application there is provided a header for a combine harvester that includes a chassis, a cross auger and a feeding mechanism. The chassis includes a forward portion, a rearward portion opposite the forward portion, and an outlet at an aft of the rearward portion. The cross auger extends in a widthwise direction of the chassis for conveying a flow of grain rearwardly thereof. The cross auger is also positioned about a rearward portion adjacent a void proximate the outlet. The feeding mechanism is mounted on the chassis within the void and proximate a posterior end of the cross auger to provide active transport of the grain downstream of the cross auger to facilitate the transport of harvested grain rearwardly towards an outlet of the header. Specifically, the feeding mechanism receives the flow of grain from the cross auger and actively conveys or otherwise transports the flow of grain rearwardly thereof so as to preclude the flow of grain from being hindered e.g., slowed down or built up, within a region of passive grain flow i.e., a void space, downstream of the cross auger.

In accordance with another aspect of the subject application there is provided a combine harvester that includes a feeder house and a header attachable to the combine harvester adjacent the feeder house. The feeder house includes an inlet for receiving a flow of grain and a feeder drum adjacent the inlet. The header is attachable to the combine harvester adjacent the feeder house and includes a chassis defining a void adjacent an outlet of the header, a cross auger and a feeding mechanism. The cross auger extends in a widthwise direction of the chassis for conveying a flow of grain towards the feeder house. The feeding mechanism is mounted on the chassis within the void and situated between the cross auger and the feeder drum to provide an active transport means to convey harvested grain to minimize or inhibit grain buildup between the header and the feeder house. Specifically, the feeding mechanism receives a flow of grain from the cross auger and actively conveys the gain to the feeder house so as to preclude the flow of grain from being hindered as it travels to the feeder house and passes through the void adjacent the outlet of the header.

In accordance with yet another aspect of the subject application there is provided a combine harvester that includes a feeder house and a header attachable to the combine harvester adjacent the feeder house. The feeder house includes an inlet for receiving a flow of grain and a feeder drum adjacent the inlet. The header includes a frame defining a void adjacent an outlet of the header, a conveyor extending in a widthwise direction of the frame, and a feeding mechanism mounted on the frame within the void and positioned between the conveyor and the feeder drum in an area of the header previously void of any active transport means. The feeding mechanism thereby actively transports harvested grain downstream of the conveyor and through the void towards the inlet of the feeder house.

BRIEF DESCRIPTION OF THE SEVERAL VIEWS OF THE DRAWINGS

The foregoing summary, as well as the following detailed description of the various aspects of the subject application will be better understood when read in conjunction with the appended drawings. For the purpose of illustrating the subject application, there are shown in the drawings aspects of the subject application. It should be understood, however, that the subject application is not limited to the precise arrangements and instrumentalities shown.

In the drawings.

DETAILED DESCRIPTION

Reference will now be made in detail to the various aspects of the subject application illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, above, below, right, left, front, rear and diagonal, are used with respect to the accompanying drawings. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

The terms "grain" and "grains" are used throughout the specification for convenience and it should be understood that these terms are not intended to be limiting. Thus, "grain" and "grains" refers to that part of a crop which is harvested and separated from discardable portions of the crop.

Figure 1:
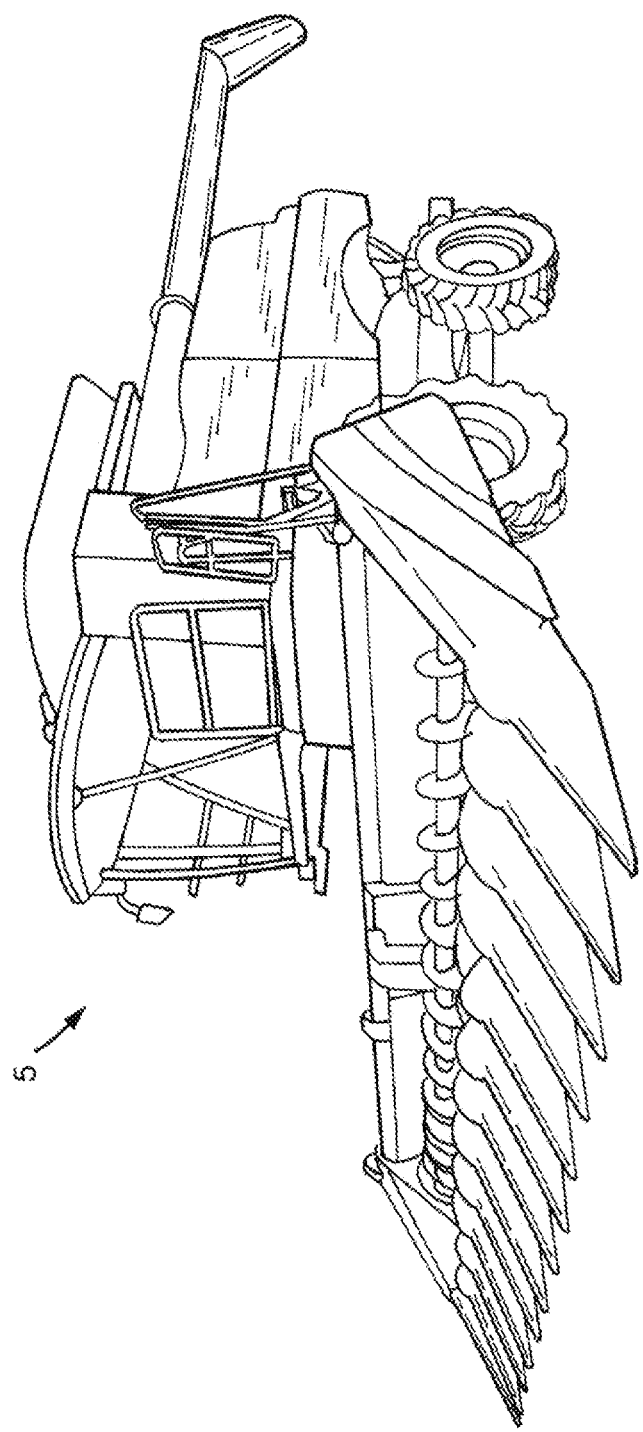
FIG. 1 is a front perspective view of a combine harvester having a corn header in accordance with an aspect of the subject application.
Figure 8:
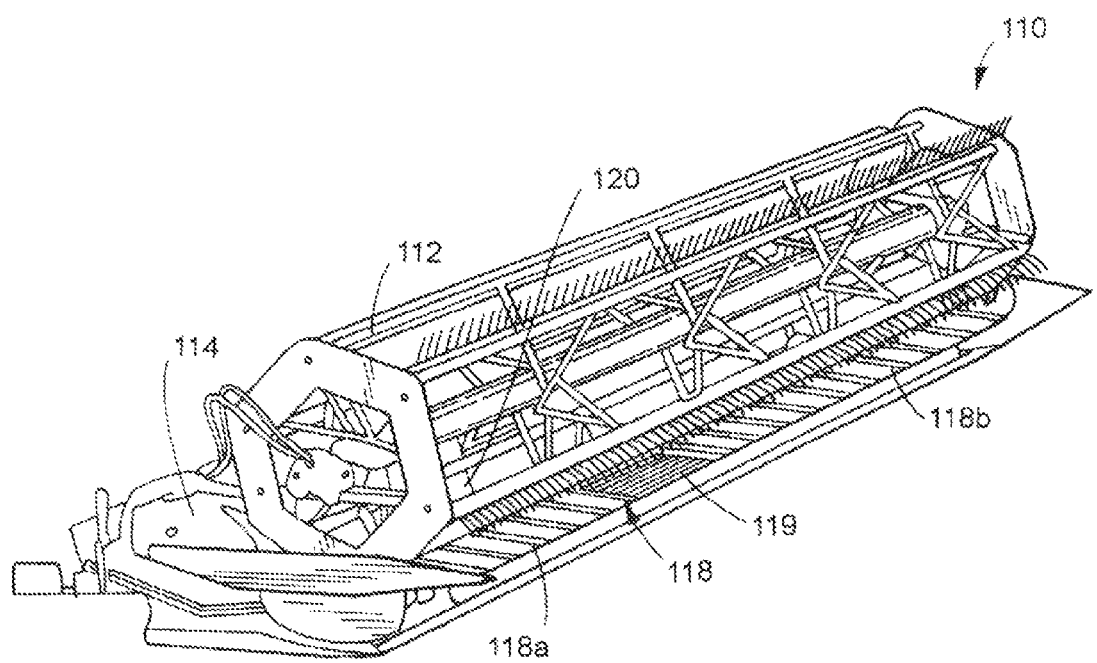
FIG. 8 is a perspective view of a draper header in accordance with a further aspect of the subject application.

In accordance with an aspect of the subject application there is provided a header 10 for a combine harvester (also referred to herein as a combine) 5. The header 10 can be any header having a cross auger or conveyor for conveying grain to an outlet of the header 10 and subsequently to a feeder house 22 of the combine 5. Such headers can include, but not limited to, a corn header (FIG. 1), a grain header (FIG. 2), and a draper header (FIG. 8).

Referring to FIGS. 2-7, for purposes of illustrating an aspect of the subject application, the foregoing will be described for an auger based grain header (also referred to herein as an auger header) 10. In general, the auger header 10 includes a gathering reel 12 that extends in a widthwise direction across the entire width of the header's chassis (or frame) 14. The chassis 14 defines a void or "dead zone," as further discussed below, adjacent an outlet of the header 10. Specifically, the chassis 14 includes a forward portion 14a and a rearward portion 14b opposite the forward portion. The chassis 14 also includes an outlet 20 at an aft of the rearward portion 14b. The gathering reel 12 is adjustably mounted to the chassis so as to be adjustably positioned based upon a predetermined criterion. The header 10 is attachable to the combine 5 adjacent the feeder house 22.

Figure 2:
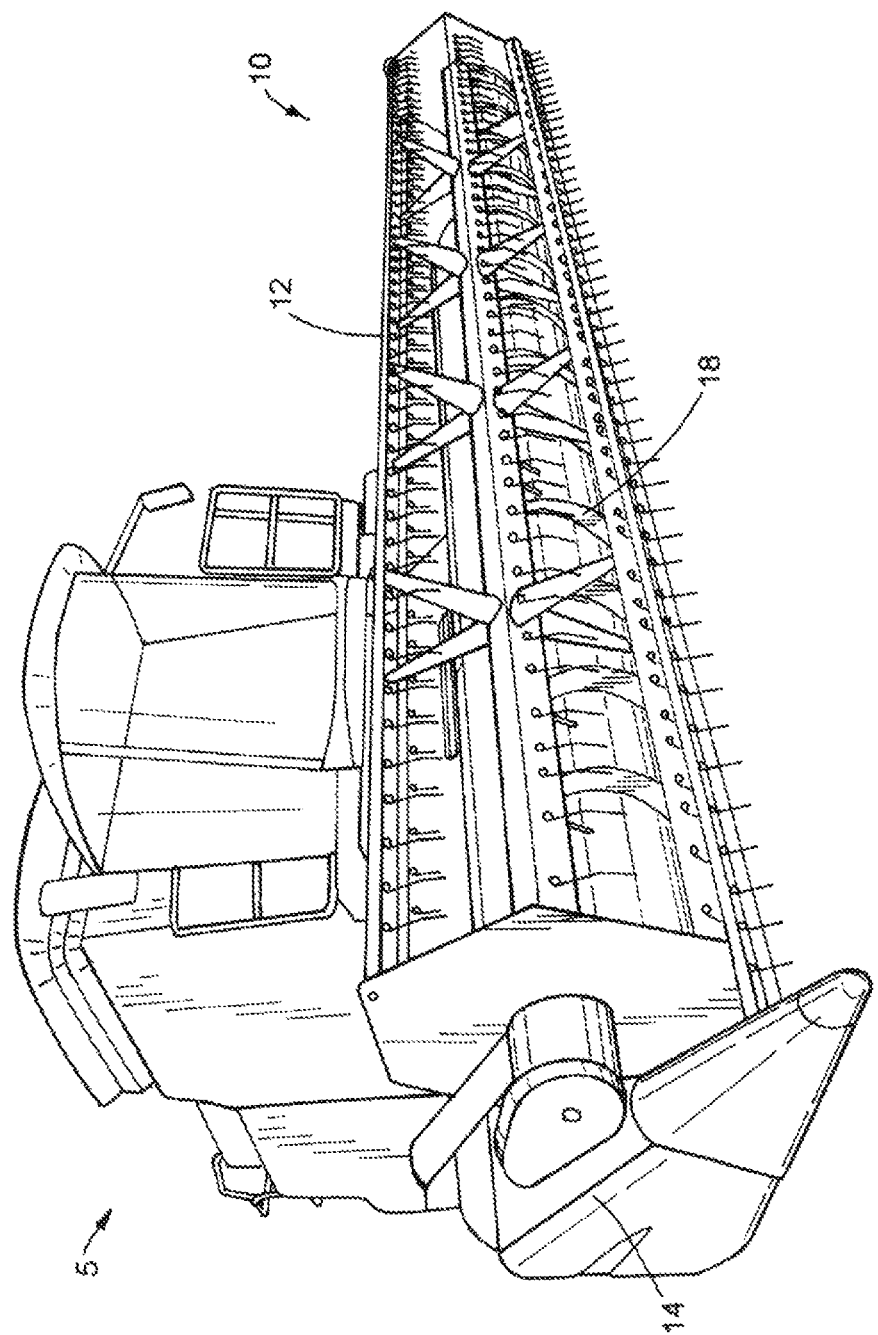
FIG. 2 is a front perspective view of a combine harvester having an auger header in accordance with another aspect of the subject application.
Figure 3:
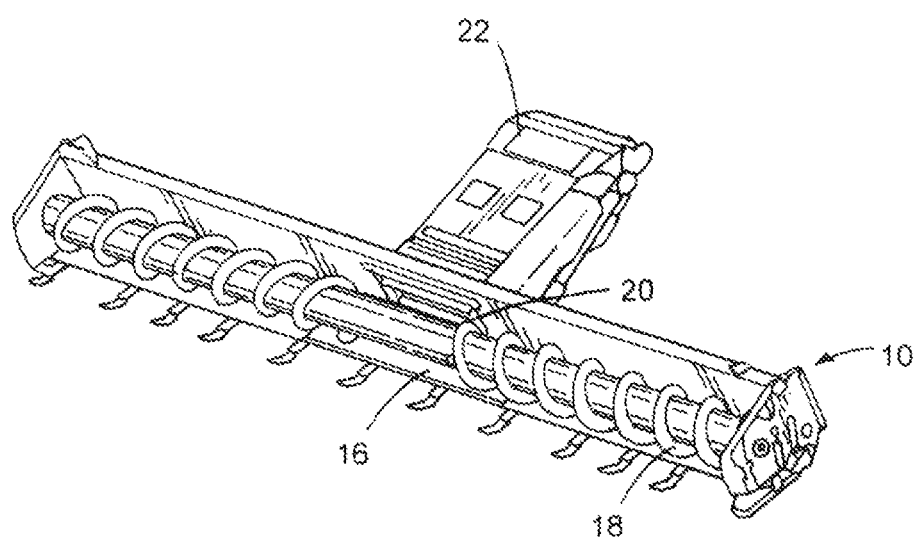
FIG. 3 is a partial perspective view of an auger of the header of FIG. 2 without a harvester reel.
Figure 4:
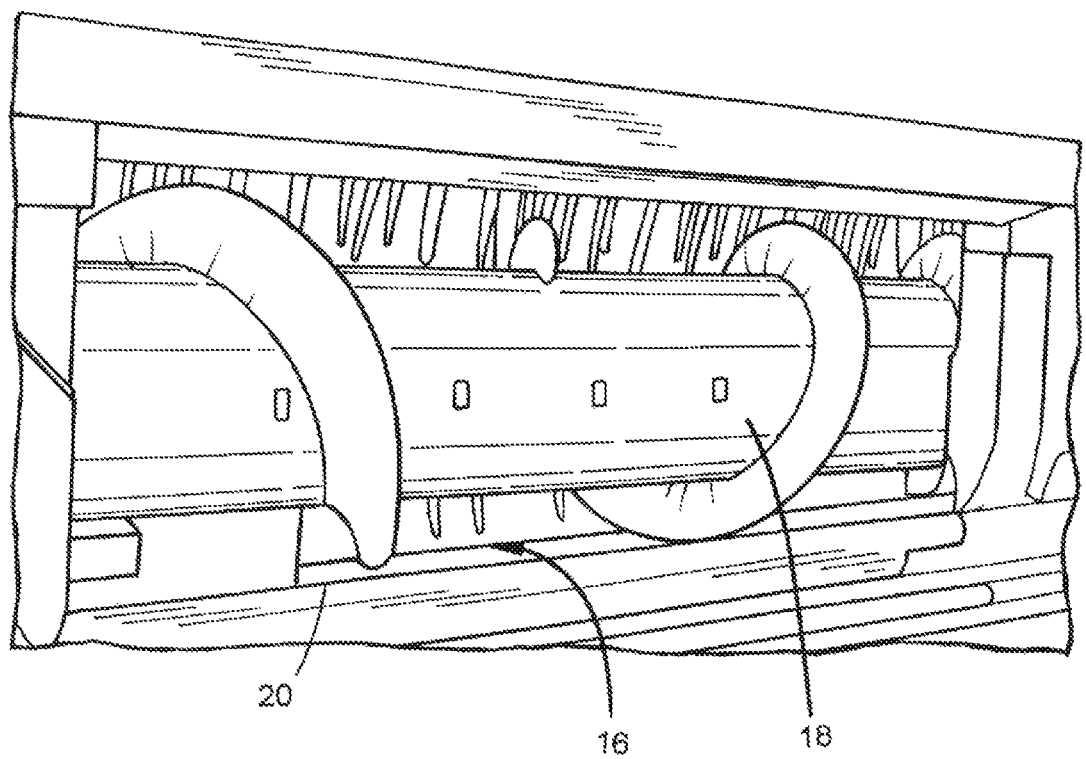
FIG. 4 is an enlarged partial rear perspective view of the auger header of FIG. 2 showing an outlet.

Referring to FIGS. 2 and 3, the header 10 includes an auger trough 16 and a cross auger 18, each of which extends from one side of the header to the opposite side in a widthwise direction. In general, the cross auger 18 extends in a widthwise direction of the chassis 14. Specifically, the cross auger extends in a widthwise direction of the header such that a longitudinal axis of the cross auger 18 is generally parallel to a longitudinal direction of the header 10. The auger trough 16 is situated in a side to side relation with the cross auger 18 such that the cross auger 18 conveys grain situated within the auger trough towards the outlet 20 (FIG. 4) of the header. The cross auger 18 is positioned on the header 10 relative to the auger trough 16 such that its auger flights are slightly spaced apart from the walls of the auger trough so as to effectively convey grain within the auger trough.

The outlet 20 of the header 10 is positioned about the middle of the header 10 and aft of the rearward portion 14b. Thus, as shown in FIG. 3, the cross auger 18 is configured such that its right half conveys grain within the auger trough 16 towards the combine's left while its left half conveys grain within the auger trough 16 towards the combine's right. The outlet 20 is also sized to substantially match the size of an inlet 28 of the feeder house 22. The outlet 20 is in fluid communication with the auger trough 16 for receiving a flow of grain from the auger trough 16.

Figure 5:
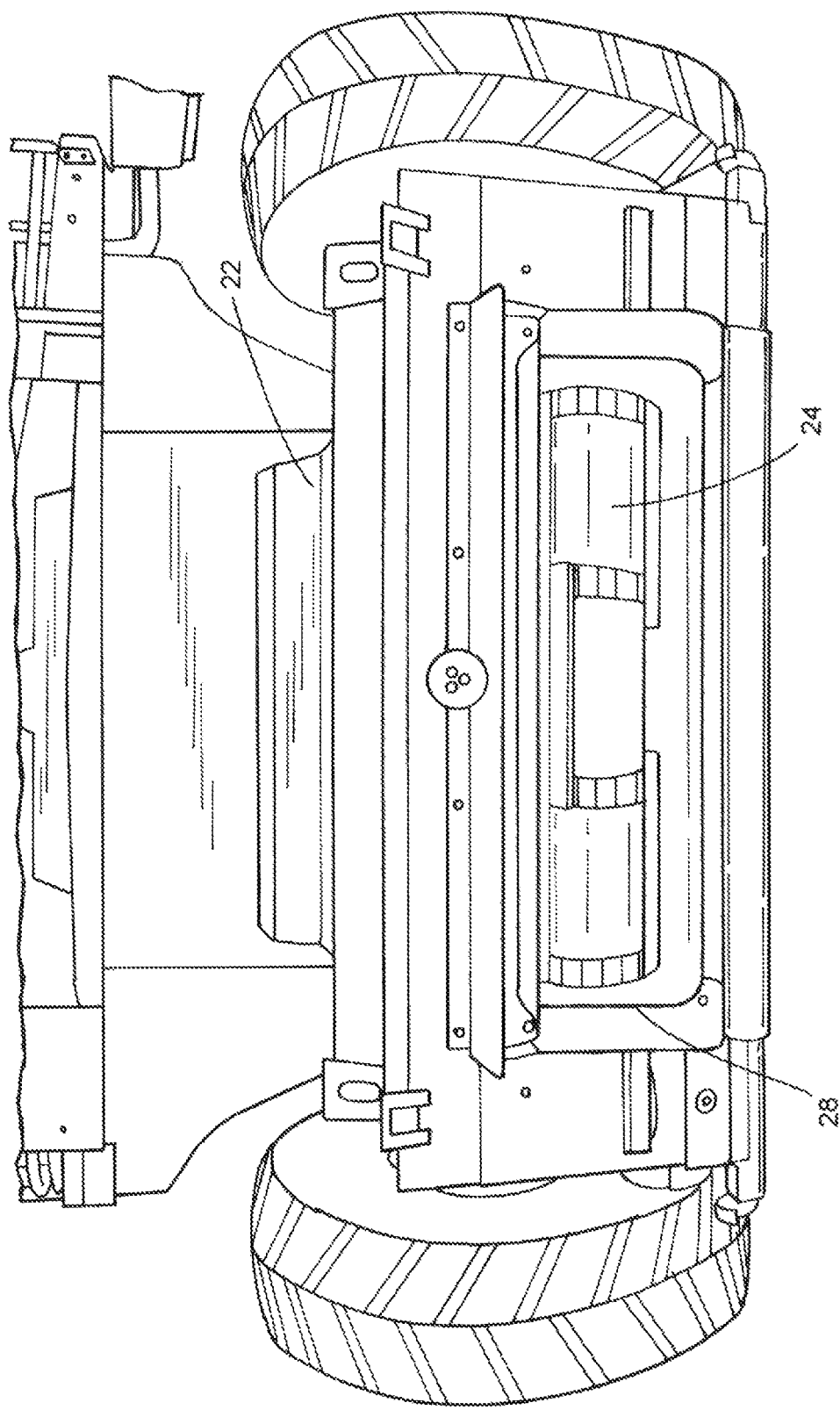
FIG. 5 is a front perspective view of a feeder house of the combine harvester of FIG. 2.
Figure 6:
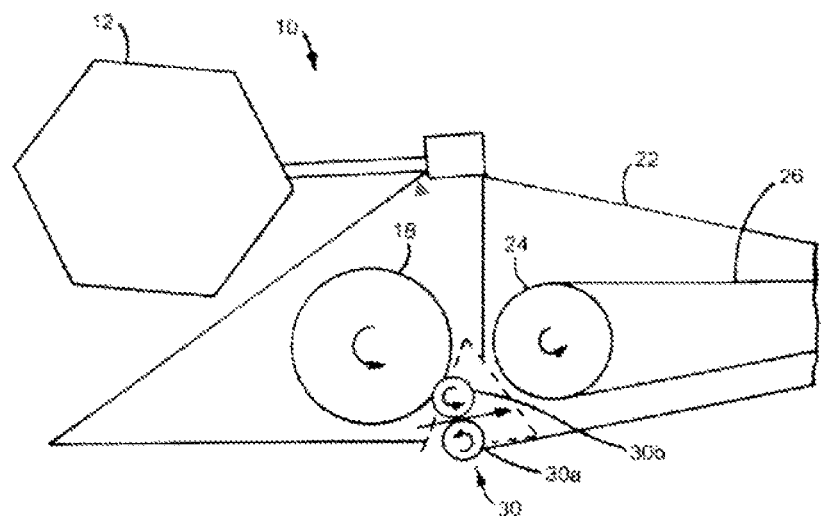
FIG. 6 is a schematic cross-sectional side view of the combine harvester of FIG. 2 in accordance with an aspect of the subject application.

Referring to FIGS. 5 and 6, the feeder house 22 includes a feeder drum 24 operatively connected to a feed conveyor 26 for transporting grain rearwardly within the combine for downstream processing. The feeder drum 24 rotates about a longitudinal axis that extends in a direction substantially parallel to a widthwise direction of the combine. The feeder drum 24 is positioned adjacent an inlet 28 of the feeder house 22 for receiving a flow of grain. The inlet 28 is sized and configured to substantially mate with the outlet 20 of the header 10 so as to be in fluid communication therewith.

FIG. 6 is a simplified schematic illustration of the header 10 attached to the feeder house 22. When the header 10 is attached to the feeder house 22, the cross auger 18 is spaced from the feeder drum 24. As a result of this spacing, a substantially triangular-shaped "dead zone" or void results where grain is not actively transported from one location to the next. It is as a result of this "dead zone" or void that grain processed through the header 10 can accumulate and thereby negatively impact the overall efficiency and operation of the combine during harvesting operations. In conventional combine harvesters, due to the overall cylindrical shape of the header's cross auger and the feederhouse feed drum, there exists a region or void space between them at or below their respective central rotational axes that grain is not actively transported. It is due to this void and lack of any active transport means between the cross auger and feeder drum that grain flow gets inhibited and backs up. That is, grain is only passively conveyed between the cross auger and the feeder drum through the void in conventional combines.

The subject application addresses the foregoing issues with conventional headers and the associated "dead zone" or void by providing a header with a feeding mechanism 30. The feeding mechanism 30 is positioned or mounted within the void thereby providing active transport or conveyance of grain between the header 10 and the feeder house 22. In operation, the feeding mechanism 30 receives a flow of grain from the auger trough 16 for actively feeding/transporting the flow of grain towards the header's outlet 20.

The feeding mechanism 30 is mounted on the chassis 14 within the void and proximate a posterior end of the cross auger 18. The feeding mechanism 30 can be mounted to the chassis 14 by any conventional means. The length of the feeding mechanism 30 extends a length so as to completely extend across the width of the header outlet 20 and/or feeder house inlet 28.

Positioning the feeding mechanism 30 within the void advantageously actively conveys grain to the feederhouse 22 and inhibits grain build up at the feederhouse inlet. As shown in FIG. 6, the "dead zone" or void is of a generally triangular-shape like prism area and the feeding mechanism 30 is positioned about a lower left side of the triangular-shape like prism "dead zone."

The feeding mechanism 30 is positioned below the cross auger 18. The feeding mechanism 30 is also positioned between the cross auger 18 and the outlet 20. Further, the feeding mechanism 30 is positioned below a central longitudinal axis of rotation of the cross auger 18 and a central longitudinal axis of rotation of the feeder drum 24.

In this particular aspect of the subject application, the feeding mechanism 30 is configured as a pair of feed rollers 30a, 30b, with feed roller 30a being a lower feed roller and feed roller 30b being an upper feed roller positioned above the lower feed roller 30a, as shown in FIG. 6. The pair of feed rollers 30a, 30b are aligned such that an axis extending between the central longitudinal axis of rotation of each of roller 30a, 30b is substantially transverse to a longitudinal axis of the feeder house 22. The pair of feed rollers 30a, 30b is a pair of counter rotating feed rollers for receiving a flow of grain from the auger trough 16 and conveying the flow of grain rearwardly towards the feeder house 22.

Each of the pair of feed rollers 30a, 30b is sized to have a diameter smaller than the diameter of the cross auger 18 and the feeder drum 24. Each of the pair of feed rollers 30a, 30b is also sized to fit within the triangular-shape like prism "dead space" or void formed between the feeder drum 24 and the cross auger 18. Further, each of the pair of feed rollers 30a, 30b is sized to have a diameter less than the overall radius of the feeder drum 24 and/or cross auger 18.

The feed rollers 30a, 30b can be configured to have a smooth surface, a corrugated surface, or some other texture or surface shape to enhance the flow of crop therethrough without damaging grain. The feed rollers 30a, 30b are operatively powered via a motor, a hydraulic means, or electrically driven for rotation at a constant or variable speed, or any other power means suitable for the foregoing intended use, such as but not limited to being mechanically powered e.g., by chain/belt drive.

The feeding mechanism 30 can optionally be mounted to the chassis 14 such that the feeding mechanism 30 is movable between a first position and a second position. For example, the feeding mechanism 30 is mounted such that it floats between at least first and second positions as it processes grain therethrough. This can be accomplished by conventional fixtures such as a pin and slot mechanism 32 (FIG. 7) or a spring or tension mount (not shown) for the feeding mechanism 30. Mounting the feeding mechanism 30 such that it is movable between first and second positions advantageously allows the position of the feeding mechanism to be continuously adjusted to its optimal position based upon the flow of grain from the cross auger or the rate of flow of grain received from the cross auger. Specifically, as the feeding mechanism 30 receives a flow of grain from the cross auger, the feeding mechanism is adjustably positioned based upon the flow of grain received.

Figure 6A:
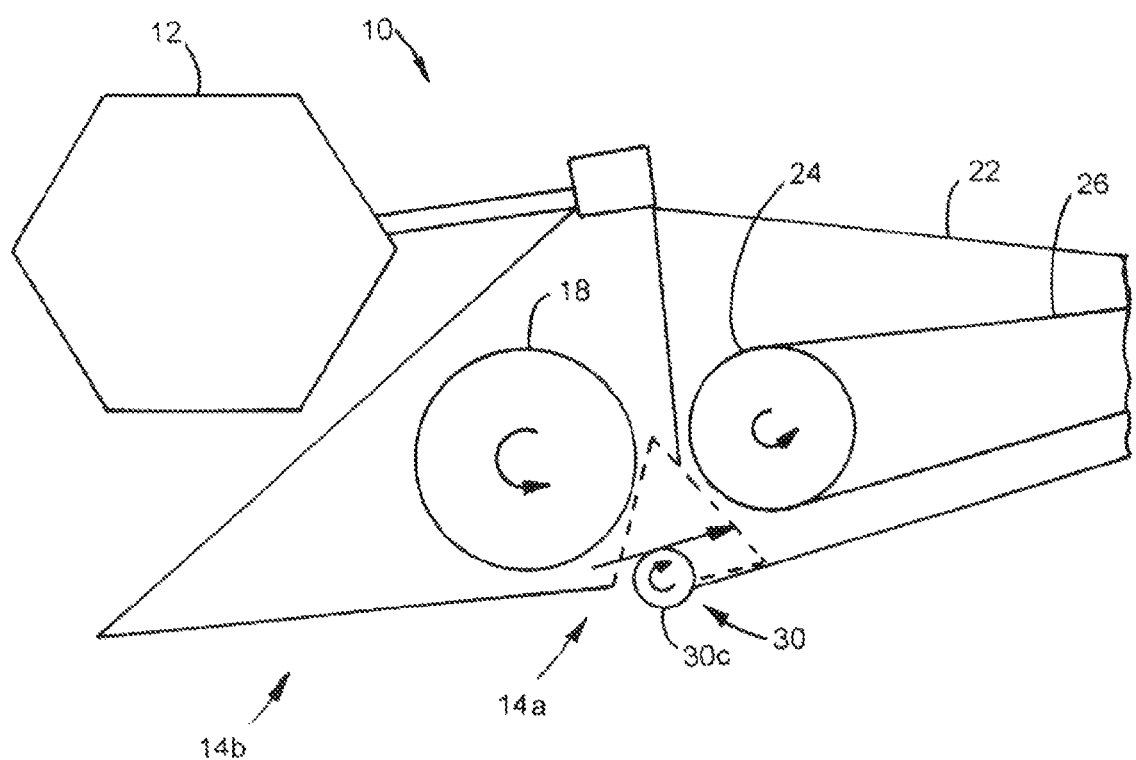
FIG. 6A is a schematic cross-sectional side view of the combine harvester of FIG. 2 in accordance with another aspect of the subject application.
Figure 6B:
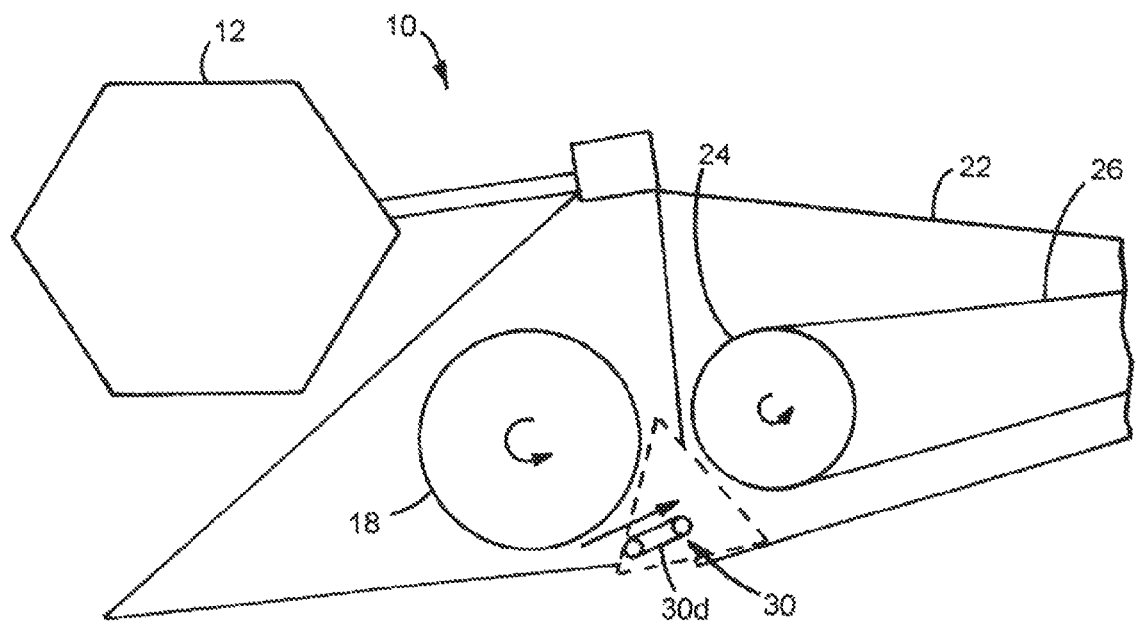
FIG. 6B is a schematic cross-sectional side view of the combine harvester of FIG. 2 in accordance with yet another aspect of the subject application.
Figure 7:
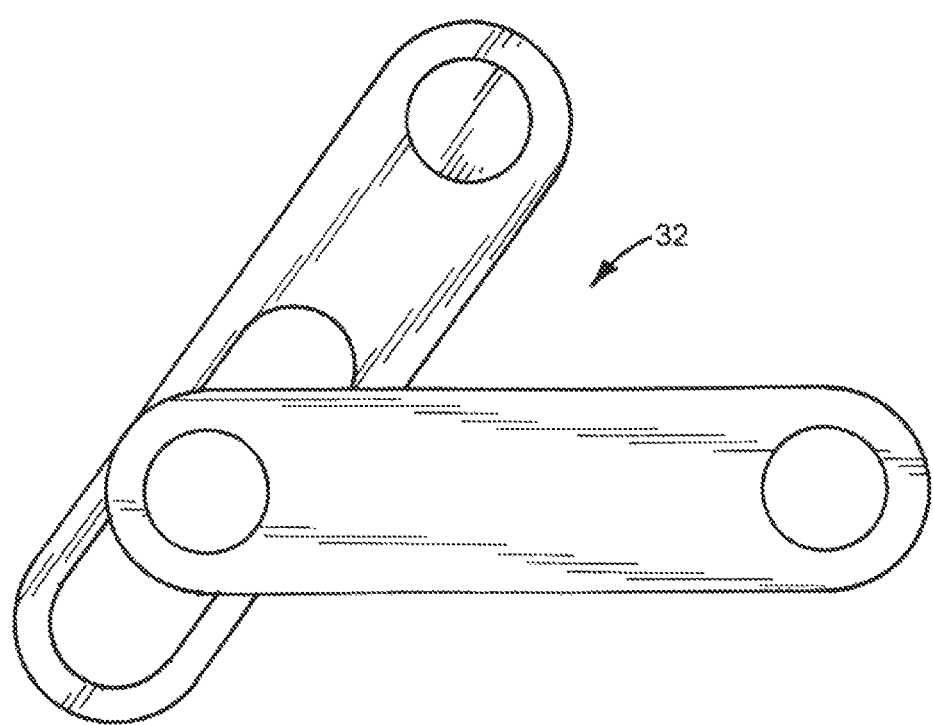
FIG. 7 is a side view of a pin and slot mechanism for mounting a feeding mechanism to a header applicable to the subject application.

Alternatively, the feeding mechanism can be configured as a single feed roller 30c, as shown in FIG. 6A. Moreover, the feeding mechanism can be configured as a conveyor belt or belt conveyor 30d, as shown in FIG. 6B.

In operation as the combine operates to harvest grain, grain is severed from its stalk and collected within the auger trough 16. The grain within the auger trough 16 is then conveyed via the cross auger 18 to the header outlet 20 which is then subsequently directed towards the feeding mechanism 30. The feeding mechanism 30 receives the flow of grain from the cross auger 18 and feeds the grain rearwardly towards the feeder house inlet 28 where it is subsequently received by the feeder drum 24 for transport to the combine internals for downstream processing. The feeding mechanism 30 advantageously facilitates the processing of grain between the transition space of the header 10 and the feeder house 22, and eliminates the buildup of grain within the transition space or void between the cross auger 18 and feeder drum 24.

Figure 9:
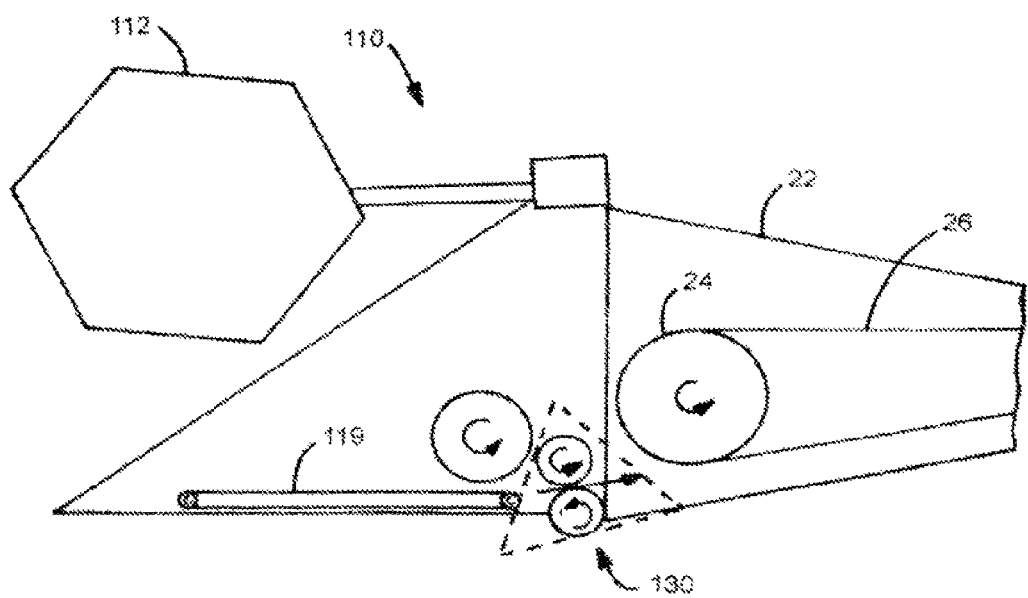
FIG. 9 is a schematic cross-sectional side view of the draper header of FIG. 8 attached to a feeder house.

FIGS. 8 and 9 illustrate another aspect of the subject application as applied to a draper header 110. The draper header 110 includes a gathering reel 112 that extends in a widthwise direction across an entire frame 114 of the draper header 110, and a conveyor 118 for feeding a flow of grain towards an inlet of the feed house. The frame 114 defines a void adjacent an outlet of the header 110. The conveyor is preferably configured as a belt conveyor for conveying grain towards the center of the draper header 110. Specifically, as shown in FIG. 8, the conveyor 118 includes a right-sided conveyor 118a for conveying grain towards the left side of the combine and a left-sided conveyor 118b for conveying grain towards the right side of the combine. The draper header 110 also includes a second conveyor 119 for conveying grain towards the rear of the draper header 110. The second conveyor 119 is positioned within the center of the draper header so as to receive the flow of grain from both the right-sided and left-sided conveyors 118, 118b. The second conveyor 119 is configured as an endless belt conveyor, but can alternatively be configured as any other conveyor applicable to a header for an agricultural combine.

Referring to FIG. 9, the draper header 110 includes a feeding mechanism 130 similar in structure and operation to the feeding mechanism 30 described above. Moreover, the feeding mechanism 130 is mounted on the frame 114 within the void and positioned between the conveyor and the feeder drum 24 of the feeder house 22. More specifically, the feeding mechanism 130 is positioned between the second conveyor 119 and an outlet 120 of the draper header 110.

In operation, grain harvested by the draper header 110 is conveyed by the conveyor 118 for conveying grain towards a center of the frame and to the second conveyor 119 for conveying grain towards the outlet 120. The feeding mechanism 130 receives the flow of grain from the second conveyor 119 and feeds the grain towards the feeder house 22 via outlet 120 which is in fluid communication with the inlet 28 of the feeder house 22 for receiving grain therefrom. Specifically, the feeding mechanism is mounted on the frame within the void and positioned between the conveyor and the feeder drum for receiving a flow of grain from the conveyor and actively conveying the grain to the feeder house so as to preclude the flow of grain from being hindered e.g., slowed down as a result of frictional forces or from build up of grain at this location, as it travels to the feeder house. As the feeding mechanism 130 is situated within a region of the void that lacks any active transport to convey grain, it advantageously minimizes or inhibits grain build up at this location.

It will be appreciated by those skilled in the art that changes could be made to the various aspects of the subject application described above without departing from the broad inventive concept thereof. It is to be understood, therefore, that this subject application is not limited to the particular aspects disclosed, but it is intended to cover modifications within the spirit and scope of the subject application as defined by the appended claims.

I claim:

1. A header for a combine harvester comprising:
    a chassis having:
        a forward portion,
        a rearward portion opposite the forward portion, and
        an outlet at an aft of the rearward portion;
    a cross auger extending in a widthwise direction of the chassis for conveying a flow of grain rearwardly thereof, wherein the cross auger is positioned about the rearward portion adjacent a void proximate the outlet; and
    a feeding mechanism comprising a pair of feed rollers mounted on the chassis within the void and proximate a posterior end of the cross auger for receiving the flow of grain from the cross auger and actively conveying the flow of grain rearwardly thereof so as to preclude the flow of grain from being hindered downstream of the cross auger.

2. The header of claim 1, wherein the feeding mechanism is positioned below the cross auger.

3. The header of claim 1, further comprising an auger trough in side to side relation with the cross auger,
    wherein the outlet is in fluid communication with the auger trough for receiving a flow of grain from the auger trough, and
    wherein the feeding mechanism receives a flow of grain from the auger trough for feeding the flow of grain towards the outlet.

4. The header of claim 1, wherein the pair of feed rollers are a pair of counter rotating feed rollers.

5. The header of claim 1, wherein the feeding mechanism floats between at least first and second positions.

6. The header of claim 1, wherein the feeding mechanism receives a flow of grain from the cross auger and is adjustably positioned based upon the flow of grain.

7. A combine harvester comprising:
    a feeder house having an inlet for receiving a flow of grain and a feeder drum adjacent the inlet; and
    a header attachable to the combine harvester adjacent the feeder house, the header including:
        a chassis defining a void adjacent an outlet of the header,
        a cross auger extending in a widthwise direction of the chassis for conveying a flow of grain towards the feeder house, and
        a feeding mechanism comprising a pair of counter rotating feed rollers mounted on the chassis within the void and situated between the cross auger and the feeder drum for receiving the flow of grain from the cross auger and actively conveying the grain to the feeder house so as to preclude the flow of grain from being hindered as it travels to the feeder house, wherein the feeding mechanism floats between a first position and a second position.

8. The combine harvester of claim 7, wherein the feed mechanism is mounted on the chassis proximate a posterior end of the cross auger.

9. The combine harvester of claim 7, wherein the header further comprises an auger trough in side to side relation with the cross auger,
    wherein the outlet is in fluid communication with the auger trough for receiving a flow of grain from the auger trough, and
    wherein the feeding mechanism receives a flow of grain from the auger trough for feeding the flow of grain towards the outlet.

10. The combine harvester of claim 9, wherein the feeding mechanism is positioned between the cross auger and the outlet.

11. The combine harvester of claim 7, wherein the feeding mechanism is positioned below a central longitudinal axis of the cross auger and a central longitudinal axis of the feeder drum.

12. The combine harvester of claim 7, wherein the feeding mechanism receives a flow of grain from the cross auger and is adjustably positioned based upon the flow of grain.

13. A combine harvester comprising:
    a feeder house having an inlet and a feeder drum adjacent the inlet; and
    a header attachable to the combine harvester adjacent the feeder house, the header including:
        a frame defining a void adjacent an outlet of the header,
        a conveyor extending in a widthwise direction of the frame for feeding a flow of grain towards the inlet of the feeder house, and
        a feeding mechanism mounted on the frame within the void and positioned between the conveyor and the feeder drum for receiving the flow of grain from the conveyor and actively conveying the grain to the feeder house so as to preclude the flow of grain from being hindered as it travels to the feeder house, the feeding mechanism including a first feed roller and a second feed roller spaced from the first feed roller defining a receiving gap for the flow of grain therebetween.

14. The combine harvester of claim 13, wherein the outlet is in communication with the inlet of the feeder house; and the header further comprises a second conveyor for conveying grain towards the outlet, wherein the conveyor conveys grain towards a center of the frame, and the feeding mechanism is positioned between the second conveyor and the outlet.

* * * * *